(12) United States Patent
Franco (10) Patent No.: US 6,728,857 B1
(45) Date of Patent: Apr. 27, 2004

(54) METHOD AND SYSTEM FOR STORING AND RETRIEVING DATA USING LINKED LISTS

(75) Inventor: Guillermo Antonio Franco, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 308 days.

(21) Appl. No.: 09/885,640

(22) Filed: Jun. 20, 2001

(51) Int. Cl.$^7$ ............................................. G06F 12/00
(52) U.S. Cl. ....................... 711/203; 370/351; 370/360; 370/395.1; 211/153; 211/108; 211/211; 211/218
(58) Field of Search ................. 370/351, 360, 370/395.1; 211/153, 203, 218, 211, 108

(56) References Cited

U.S. PATENT DOCUMENTS

| | | | | |
|---|---|---|---|---|
| 5,365,519 A | * | 11/1994 | Kozaki et al. | 370/378 |
| 5,535,197 A | * | 7/1996 | Cotton | 370/395.72 |
| 5,557,607 A | | 9/1996 | Holden | 370/58.2 |
| 5,570,348 A | | 10/1996 | Holden | 370/17 |
| 5,583,861 A | | 12/1996 | Holden | 370/395 |
| 5,893,162 A | * | 4/1999 | Lau et al. | 711/153 |
| 6,111,880 A | | 8/2000 | Rusu et al. | 370/395 |
| 6,151,301 A | | 11/2000 | Holden | 370/232 |
| 6,430,666 B1 | * | 8/2002 | Roth | 711/202 |

OTHER PUBLICATIONS

U.S. patent application titled "*Method and System for Multicasting*"; Filed: Jun. 20, 2001; application Ser. No.: 09/885,905 (25 pages—Figures 1/3).

U.S. patent application titled "Method and System for Testing Linked List Integrity"; Filed: Jun. 31, 2001; application Ser. No.: 09/920,270 (33 pages—Figures 1/6).

* cited by examiner

*Primary Examiner*—T Nguyen
(74) *Attorney, Agent, or Firm*—Baker Botts L.L.P.

(57) ABSTRACT

An method for storing and retrieving data in memory includes receiving the address of a first memory location in the data memory storing a first portion of the data and obtaining, from a location in a link memory specified by the address of the first memory location, a second address of a second memory location in the data memory storing a second portion of the data. The method also includes retrieving the first and second portions of the data in the first and second memory locations in the data memory.

18 Claims, 4 Drawing Sheets

METHOD AND SYSTEM FOR STORING AND RETRIEVING DATA USING LINKED LISTS

TECHNICAL FIELD OF THE INVENTION

This invention relates generally to computer systems and more particularly to a method and system for storing data in memory.

BACKGROUND OF THE INVENTION

Telecommunications is becoming increasingly important in today's society. The increased use of the Internet allows people to communicate data between home or business to remote locations. One format for communicating data is asynchronous transfer mode (ATM) format. Many other formats also exist.

Among other criteria, when communicating information according to ATM, cells of data of a specified size are transmitted from one location to another. Often times the cells are stored in memory at an intermediate location before being transferred to the desired destination. An example of such a procedure is the use of an ATM switch at a telecommunications central office for switching data originating from a user's home over the Internet to an appropriate destination over an Internet backbone. Such cells are often stored in a sequential manner such that data that are received first by the memory are distributed first. To effect such sequential transmission, queues are formed that designate which cells are transferred first. In some implementations, a queue exists for each destination.

Linked lists are used in some systems that store queues of ATM cells to facilitate such sequential transmissions. Traditionally, a linked list includes two entries. A first entry in the linked list specifies a corresponding memory location in data memory in which the corresponding data cell is stored. The second entry in the linked list stores the address of the next memory location in the linked list.

A problem with such an approach is that memory is required to store these addresses in the linked list. Additionally, reading and writing the addresses stored in the linked list contribute to switch latency.

SUMMARY OF THE INVENTION

Therefore, a need has arisen for a method and system for storing data. The present invention provides a method and system for storing and retrieving data that addresses disadvantages of prior systems and methods.

According to one embodiment of the invention, a method for retrieving data stored in a plurality of memory locations in data memory includes receiving the address of a first memory location in the data memory storing a first portion of the data and obtaining, from a location in a link memory specified by the address of the first memory location, a second address of a second memory location in the data memory storing a second portion of the data. The method also includes retrieving the first and second portions of the data in the first and second memory locations in the data memory.

According to another embodiment of the invention, a method for storing data in a plurality of memory locations in data memory includes storing a first portion of the data in a memory location in data memory having a first address and storing a second address in a memory location in link memory specified by the first address. The method also includes storing a second portion of the data in a memory location in data memory having the second address.

Some embodiments of the invention provide numerous technical advantages. Other embodiments may realize some, none, or all of these advantages. For example, according to one embodiment, a memory system is provided with reduced memory requirements. Such a system allows storing of data indexed by a linked list that does not require additional memory to designate the address of the location in data memory in which the data is stored. Additionally, in some embodiments, such an approach reduces the amount of logic needed to control the data memory. Furthermore, the number of pins required may be reduced by implementing such a linked list. Because the address in data memory in which a desired portion of data is stored does not need to be read from a linked list, reading and writing data may occur more rapidly. This reduces switch latency.

Other advantages may be readily ascertainable by those skilled in the art and the following FIGURES, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and which.

DETAILED DESCRIPTION OF THE INVENTION

Embodiments of the invention and its advantages are best understood by referring to FIGS. 1A through 6 of the drawings, like numerals being used for like and corresponding parts of the various drawings.

Figure 1A:
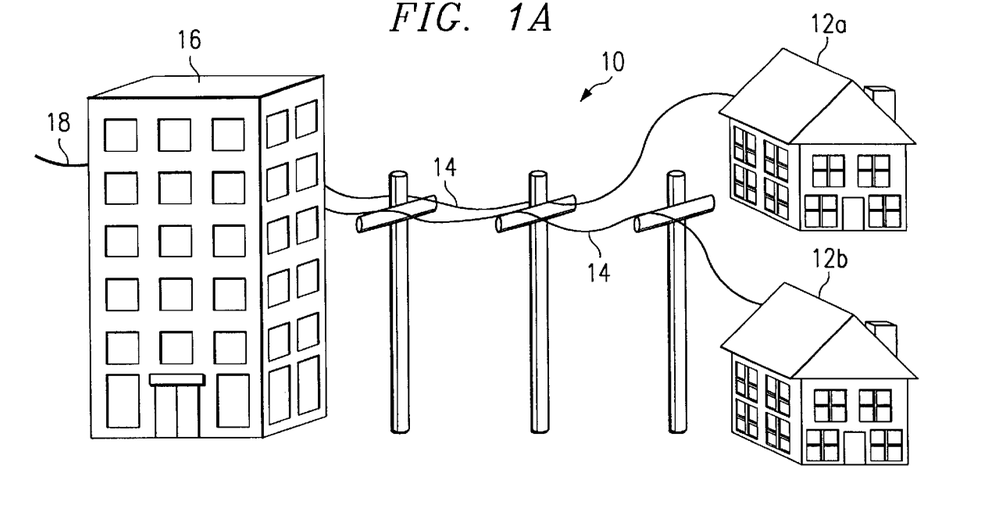
FIG. 1A is a schematic diagram showing a communications system that may utilize the teachings of the present invention.

FIG. 1A is a schematic diagram showing a telecommunications system 10 that may utilize the teachings of the invention. Telecommunications system 10 includes a plurality of customer homes 12a, 12b connected to a telecommunications central office 16 through a plurality of telephone wires 14. Central office 16 may in turn couple homes 12a and 12b to an Internet backbone 18.

Telecommunications system 10 therefore allows communication of data between homes 12a and 12b and locations remote from homes 12a and 12b (not explicitly shown) through Internet backbone 18. As described in greater detail below, central office 16 includes an asynchronous transfer mode (ATM) switch, described above, that effects switching of data from homes 12a and 12b to Internet backbone 18 as well as switching of data received over Internet backbone 18 to homes 12a and 12b.

Figure 1B:
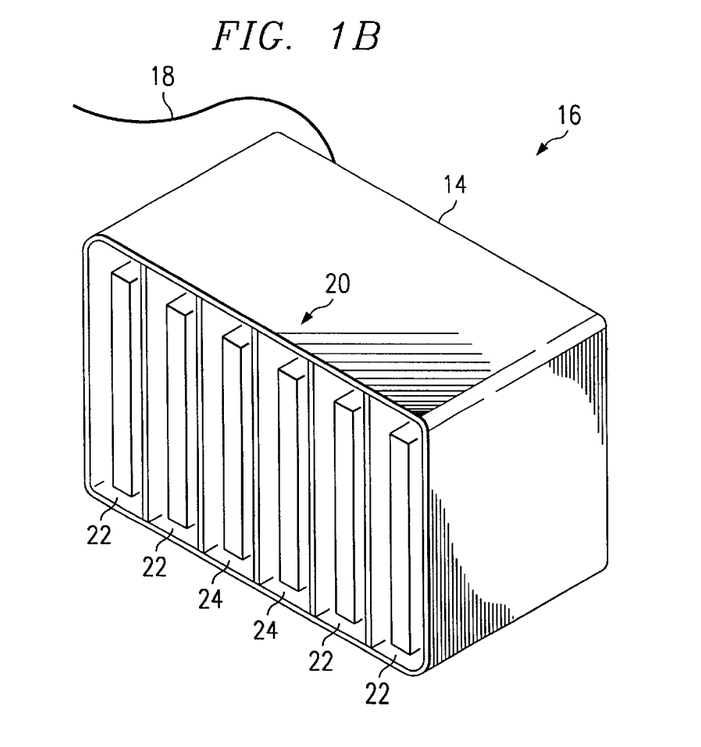
FIG. 1B is a block diagram of portions of the central office of FIG. 1A showing a telecommunications chassis according to the teachings of the invention.

FIG. 1B is a block diagram showing portions of central office 16. Shown in central office 16 is a telecommunications chassis 20 that includes a plurality of cards associated with processing communicated data. These cards may include, for example, line cards 22, network interface cards 24, and other types of cards. Line cards 22 function to receive data over telephone lines 14 and communicate the data to network interface card 24. Line cards conversely communicate data received from network interface card 24 to an associated home 12a, 12b over telephone lines 14. Network interface card 24 may perform a plurality of functions associated with transmitting and receiving data between homes 12a, 12b and Internet backbone 18; however, one particular application is switching. According to one embodiment of the invention, network interface card stores ATM cells temporarily and then transfers them at an appropriate time to a desired destination, as described in greater detail below in conjunction with FIG. 1C. Transferring the cells to a desired location is referred to as switching and, in this manner, network interface card 24 acts as an ATM switch.

Figure 1C:
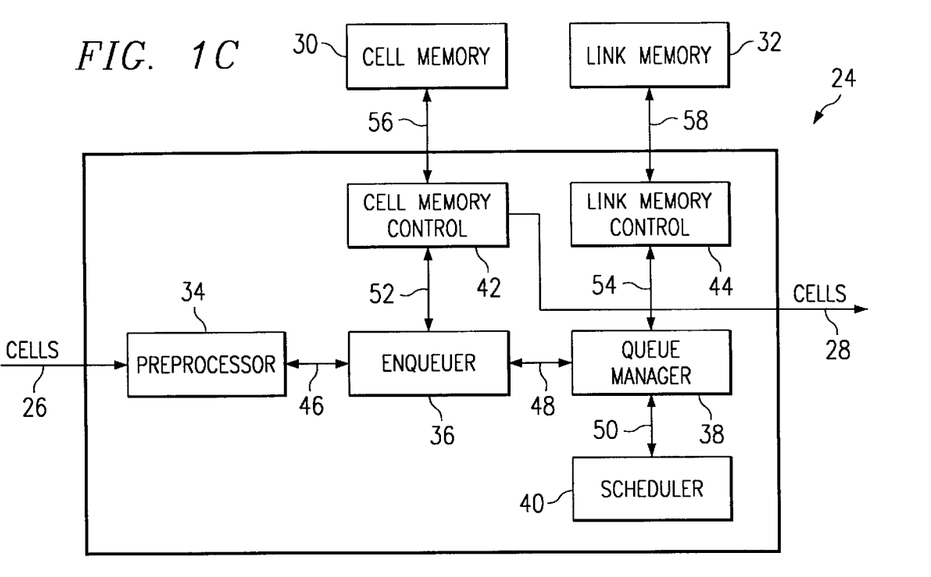
FIG. 1C is a block diagram of an ATM switch of FIG. 1B according to the teachings of the invention.

FIG. 1C is a block diagram of the network interface 24 of FIG. 1B. FIG. 1C also shows a cell memory 30 and a link memory 32 associated with network interface card 24.

Network interface card 24 receives a plurality of cells, denoted by reference numeral 26, stores the cells temporarily, and transmits the cells to a desired destination, denoted by reference numeral 28. Received cells may originate from homes 12a and 12b over telephone lines 14 and may be intended for destinations connected through Internet backbone 18. Alternatively, cells 26 may originate from sources connected to Internet backbone 18 and be intended for homes 12a and 12b. Received cells entering network interface card 24 are stored temporarily in cell memory 30. At an appropriate time the cells that are stored in cell memory 30 are transmitted to an appropriate destination, as denoted by reference numeral 28. Link memory 32 associated with network interface card 24 stores a plurality of queues designating the order in which the cells will be transferred to any one location, such as home 12a. For example, link memory 32 may store a queue associated with each potential destination, such as homes 12a and 12b. A plurality of cells may be received by network interface card 24 and stored in cell memory 30. These cells are then transferred at an appropriate time for receipt by home 12a. However, the order in which the cells are transmitted is retained in the same order as they were received. To facilitate such ordered transfer, link memory 32 is used to designate the location of cells stored in cell memory 30 and the order that such cells should be transferred.

According to the teachings of the invention, link memory 32 stores a sequence of addresses that specify the order in which the cells stored in cell memory are transferred. Instead of storing an address in link memory identifying the location in cell memory 30 in which the respective data cells are stored, cell memory 30 and link memory 32 each include memory locations with addresses having one-to-one correspondence with each other (the same address). By having this one-to-one correspondence between addresses in link memory and cell memory, the address of the location in link memory that stores a subsequent address in the link memory is also used to identify the location of the associated data in the sequence in cell memory. Thus, instead of storing an address of a cell memory location in link memory, the address location in link memory is also used to identify a particular data portion in cell memory. The teachings of the invention are applicable to contexts other than ATM switches, but the invention is described below with reference to an ATM switch for clarity of description.

ATM switch 24 includes a plurality of elements to facilitate storing and retrieving data for transmittal. Such components include a preprocessor 34, an enqueuer 36, a queue manager 38, a scheduler 40, a cell memory control unit 42, and a link memory control unit 44. Preprocessor 34 communicates with enqueuer 36 through bi-directional link 46. Enqueuer 36 communicates with queue manager 48 through bi-directional link 48. Queue manager 50 communicates with scheduler 40 through bi-directional link 50. Enqueuer 36 communicates with cell memory control unit 42 through bi-directional link 52. Queue manager 38 communicates with link memory control unit 44 through bi-directional link 54. Cell memory control unit 42 communicates with cell memory 30 through bi-directional link 56. Link memory control unit 44 communicates with link memory 32 through bi-directional link 58. Cells of data retrieved from cell memory 30 are communicated through cell memory control unit 42 for transmission out of switch 24, as denoted by reference numeral 28.

Preprocessor 34 may perform a plurality of functions in receiving cells and conditioning them for receipt and processing by enqueuer 36. For example, preprocessor 34 may classify the received cell. Classification refers to identifying the origin of the cell and the type of the cell. Preprocessor 34 may also police the receipt of the cells. Policing refers to determining if a particular type of cell is allowed according to an associated service contract. The result of the classification and policing functions is provided to enqueuer 36 over lines 46, in addition to the received cells.

Enqueuer 36 either discards the cells if they are not allowed, or sends them to cell memory over link 52 in conjunction with cell memory control unit 42. As described in greater detail below, enqueuer 36 cooperates with queue manager 38 over bi-directional line 48 to generate a sequence of addresses to be stored in a queue designating the order of the received cells for later retrieval. According to one embodiment, a separate queue is maintained for each destination.

Queue manager 38 communicates the sequence of addresses for storing in link memory 32 over link memory control unit 44. Scheduler 40 communicates with queue manager 38 at an appropriate time to initiate retrieval of data as needed, as described in greater detail below.

The operation of network interface card 24 is described in greater detail below in conjunction with FIGS. 5 and 6.

Figure 2:
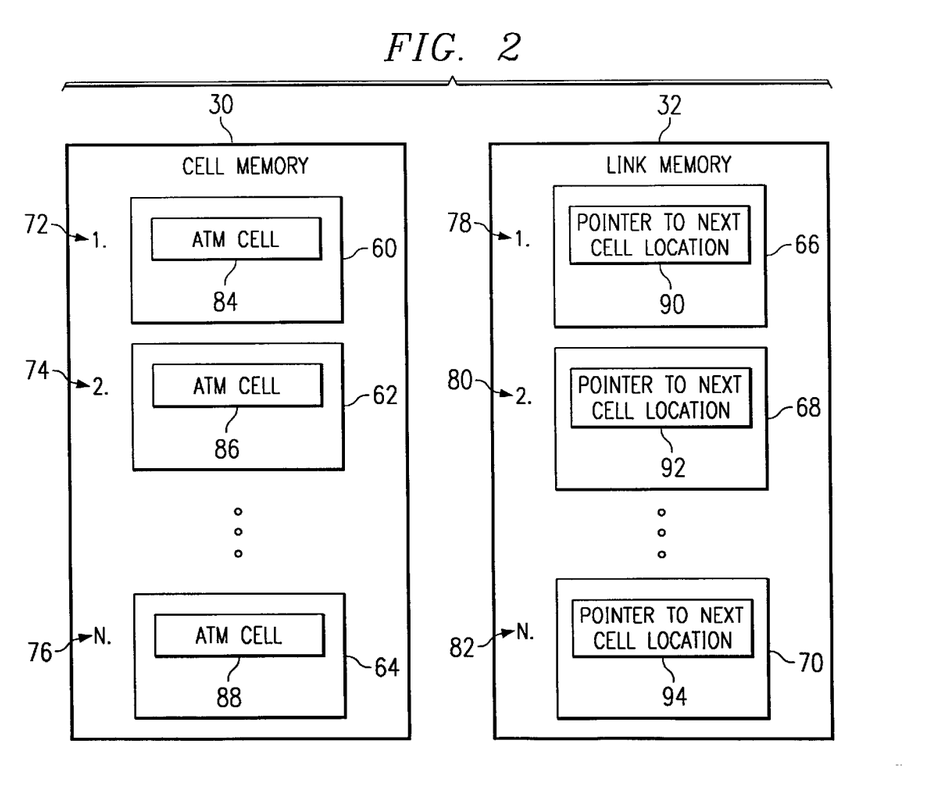
FIG. 2 is a block diagram showing cell memory and link memory associated with the ATM switch of FIG. 1C.

FIG. 2 is a block diagram of cell memory 30 and link memory 32 showing additional details of those memories. Cell memory 30 includes a plurality of memory locations 60, 62, and 64. Link memory 32 also includes a plurality of memory locations 66, 68, and 70. Each memory location 60, 62, 64, in cell memory 30 has an associated address 72, 74, and 76. Each memory location 66, 68, 70 in link memory 32 has an associated address 78, 80, and 82.

According to the teachings of the invention memory location 60 in cell memory 30 is associated with memory location 66 in link memory 32; each of those memory has the same address (both address 72 and 78 have an address of "1" in this example). Memory locations 62 and 80 and 76 and 82 are similarly associated. Stored in memory location 60 in cell memory 30 is an ATM cell 84. Similarly, ATM cells 86, and 88 are stored in memory locations 62 and 64, respectively, of cell memory 30. Although any suitable size of memory locations 60, 62, and 64 may be used, it is particularly advantageous in one embodiment to utilize 64 byte size memory locations to accommodate a 53 byte ATM cell. A pointer 90 to a next memory location in link memory 32 is stored in memory location 66. Similarly, pointers 92 and 94 are stored in memory location 68 and 70, respectively, of link memory 32. Although any appropriate memory size may be utilized for memory locations 66, 68, and 70, according to one embodiment, only three bytes are utilized for each of these memory locations.

According to the teachings of the invention, memory locations 66, 68, and 70 each store a pointer to the next memory location in link memory 32 that stores a subsequent address in a data sequence, but link memory locations 66, 68, and 70 do not store a pointer to the address in cell memory 30 storing the associated data. Rather, the address in link memory (78, 80, 82) automatically points to the data stored at the address of the same number in cell memory 30 (72, 74, and 76 respectively). This reduces memory requirements for link memory 32, and, as described in greater detail below, reduces switch latency.

Figure 3:
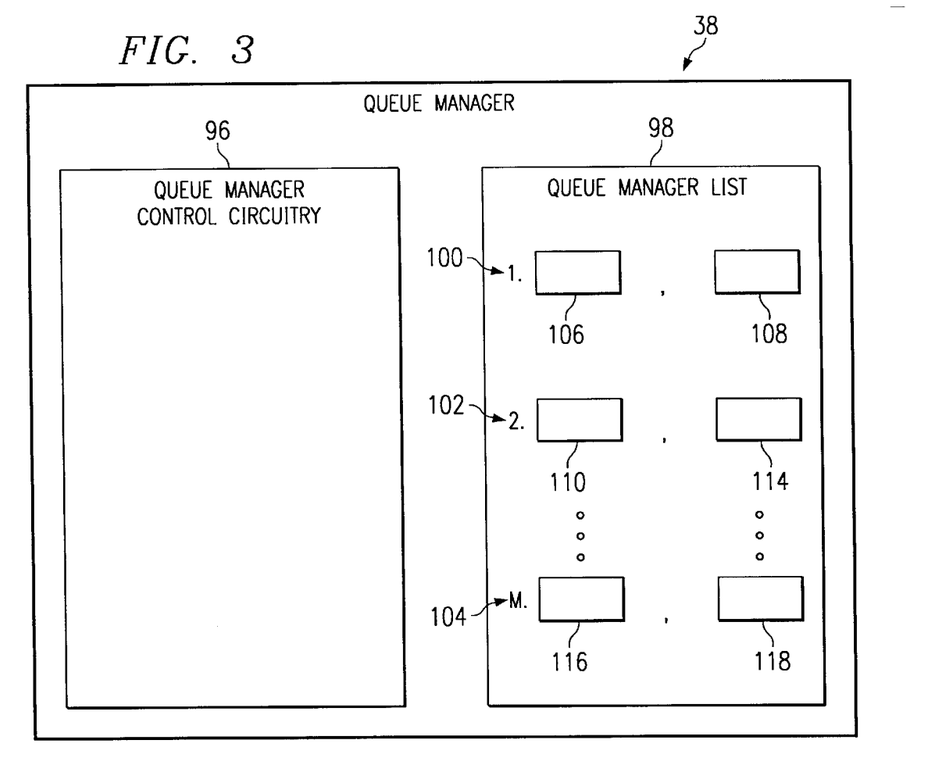
FIG. 3 is a block diagram of the queue manager of the ATM switch of FIG. 1C.

FIG. 3 is a block diagram of queue manager 38. Queue manager 38 includes a queue manager control circuitry unit 96 and a queue manager list 98. Queue manager control circuitry unit 96 performs the functions of queue manager 38 described above. Queue manager list 36 includes a plurality of queue designators 100, 102, 104 associated with respective queues stored in link memory 32. Queue designator 100 stores a head pointer 106 and a tail pointer 108 for data intended for a particular device. Head pointer 106 points to the location in link memory 32 associated with the first data entry in the associated queue of data. Tail pointer 108 stores an address in link memory 32 associated with the last data entry for the associated queue of data. Queue designator 102 also stores a head pointer 110 and a tail pointer 114 for data intended for a second device. Queue designator 104 also stores a head pointer 116 and a tail pointer 118 for data intended for a third device.

Figure 4:
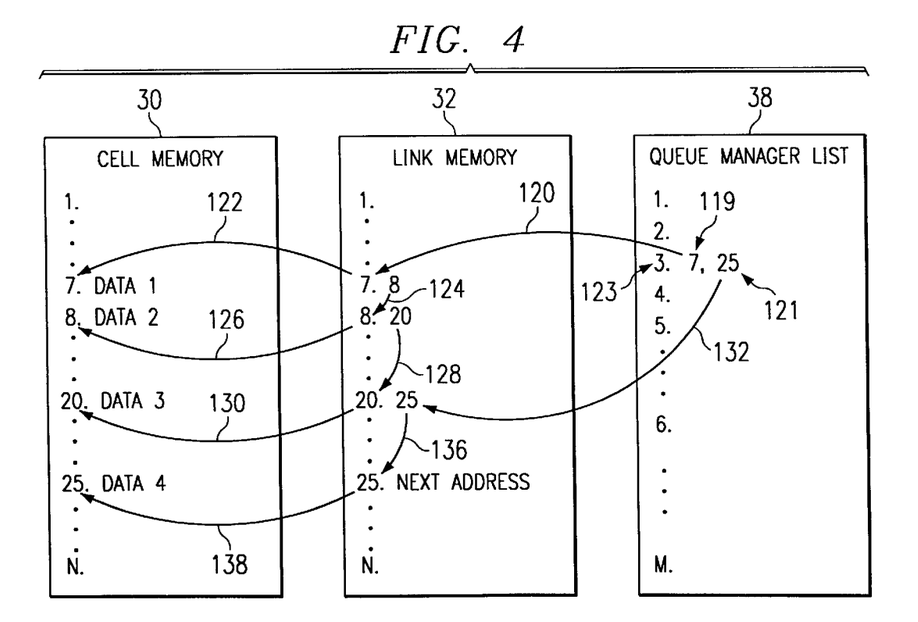
FIG. 4 is a block diagram of the cell memory and link memory of FIG. 1 and portions of the queue manager of FIG. 3, illustrating the relationship between the various memories.

FIG. 4 is a block diagram showing additional details of cell memory 30, link memory 32, and queue manager list 38. In this example, queue manager list stores at a queue designator location 123 a head pointer 119 having a value of "7" and a tail pointer 121 having a value of "25." Head pointer 119 points to the address in link memory 32 that is associated with the first data entry for the queue designated by queue designator 123. This relationship is illustrated in FIG. 4 by reference numeral 120.

According to the teachings of the invention, the link memory location having an address of "7" is associated with and effectively points to a memory location in cell memory 30 also having the address of "7," as denoted by reference numeral 122. This memory location in cell memory 30 stores the first portion of data in the queue ("DATA1"). This association avoids having to store a separate pointer in link memory pointing to locations in cell memory 30. In addition, the link memory location having an address of "7" stores the address of the link memory location ("8") that stores the next address ("20") in the sequence of addresses associated with the queue designated by queue designator 123, as denoted by reference numeral 124. The link memory location having an address of "8" also "points" to the cell memory location having an address of "8," designating the location of the next data entry in the queue. This is denoted by reference numeral 126. This memory location in cell memory 30 stores the next portion of the data in the queue ("DATA2").

The link memory location having an address of "8" stores the value of "20." This designates the next location in link memory 32 that stores an address associated with this queue. This association is denoted by reference numeral 128. The link memory location having an address of "20" also points to cell memory location having the same address, as designated by reference numeral 130. The cell memory location having an address of 20 stores the next portion of data in the queue ("DATA3"). The link memory location having an address of "20" also stores a value of "25." As described above, tail pointer 121 has a value of "25." Thus, the next portion of data stored in cell memory 30 ("DATA4") is stored in the cell memory location having an address of 25, as denoted by reference numeral 138. Additionally, the next address at which subsequent address in link memory will be stored is at the location having an address of "25."

Figure 5:
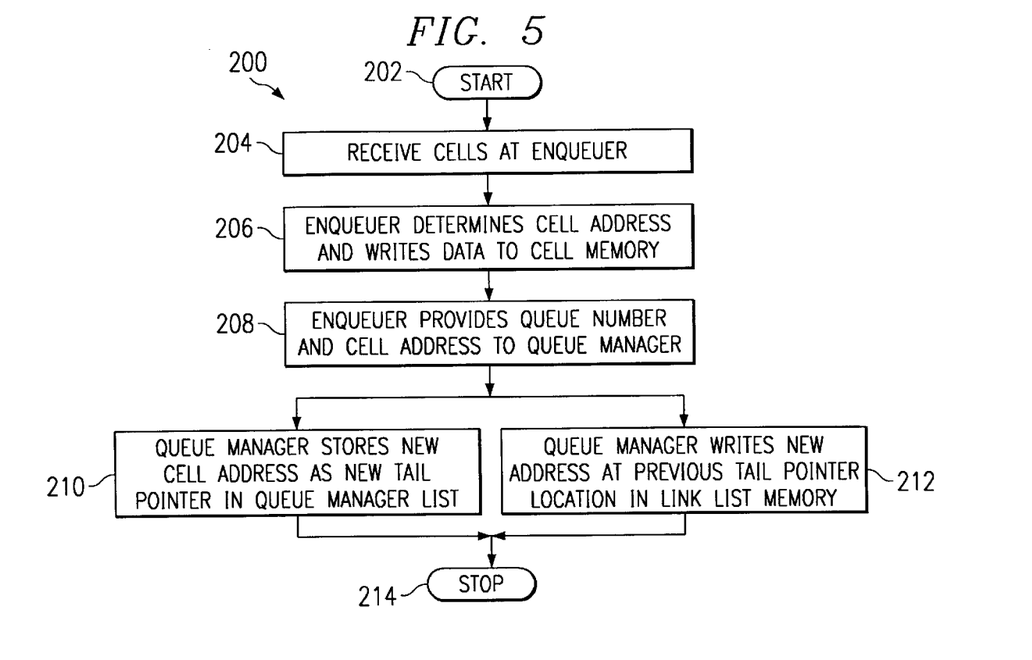
FIG. 5 is a flowchart showing a method for storing data according to the teachings of the invention.

FIG. 5 is a flowchart illustrating example steps associated with a method 200 for storing data according to the teachings of the invention. The method is described with reference to FIGS. 1C through 5.

The method begins at step 202. At a step 204 an enqueuer, such as enqueuer 36, receives cells of data. At a step 206, the enqueuer determines a cell address in which to write the cell and initiates writing data to cell memory. Determination of where the data cell is written may be performed according to a variety of techniques and may involve, in some embodiments, cell memory control unit 42.

At a step 208, enqueuer 36 provides a queue number and the cell address to queue manager 38 over link 48. The queue number designates the number of the queue for which data is received. In some embodiments, a separate queue is maintained for each device receiving or transmitting data. The received cell address corresponds to the address in cell memory 30 storing the received cell. At a step 210, queue manager 38 stores the received cell address as a new tail pointer in queue manager list 38. With reference to FIG. 4, this corresponds to replacing tail pointer 121 having a value of "25" with a new value. At the same time, queue manager 38 writes the received address at the previous tail pointer location in linked list memory. With reference to FIG. 4 this corresponds to writing the new value for the tail pointer 25 in a link memory location having an address of "25."

According to the teachings of the invention, steps 210 and 212 may occur substantially concurrently because there is a one-to-one correspondence between the address in link memory storing the next address in the linked list and the address of the location in cell memory 30 at which the associated data is stored. The method concludes at step 214. Thus according to the teachings of the invention, by designating a one-to-one correspondence between memory locations in cell memory 30 and memory locations in link memory 32, data may be written in a quicker fashion, reducing switch latency. This is possible, in some embodiments, because a one-to-one correspondence between cell memory locations and link memory locations does not require writing of a cell address into link memory 32.

Figure 6:
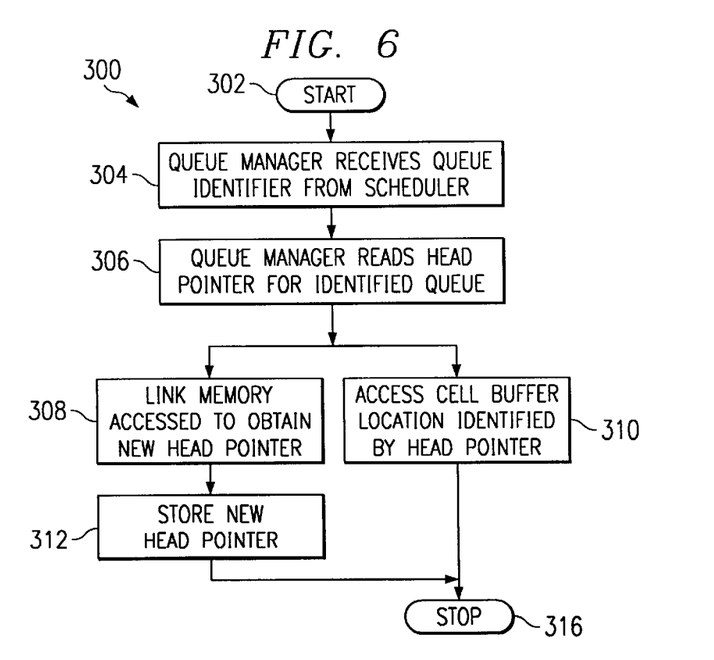
FIG. 6 is a flowchart showing a method for retrieving data according to the teachings of the invention.

FIG. 6 is a flowchart illustrating a method 300 for retrieving data according to the teachings of the invention. The method is described with reference to FIGS. 1C through 4 and FIG. 6.

The method begins at step 302. At a step 304, queue manager 38 receives a queue identifier from scheduler 40. The queue identifier identifies a particular queue for which data will be retrieved and in some environments may be associated with a particular device. At a step 306, the queue manager reads the current head pointer for the identified queue. With reference to FIG. 4, such a reading of the current head pointer corresponds to reading head pointer 119 (having a value of "7"). At a step 308, the location in link memory 32 identified by the current head pointer is accessed to obtain the next head pointer, or pointer to the next address in link memory associated with data in the queue. With reference to FIG. 4, this next address refers to "8." At the same time, at step 310, the cell location identified by the current head pointer (in this example "7") is accessed to retrieve data stored at that location. With reference to FIG. 4, this refers to retrieving "DATA1" stored in memory location "7" in cell memory 30. According to the teachings of the invention, steps 308 and 310 may be performed substantially concurrently because the link memory does not have to be accessed to obtain the location in cell memory at which data is stored. This is due to the one-to-one correspondence between cell memory locations and link memory locations. At step 312, the new head pointer is stored. Processing concludes at step 314.

Thus, according to the teachings of the invention, data may be stored with reduced switch latency due to the one-to-one correspondence between link memory and cell memory.

Although the present invention has been described with several example embodiments, various changes and modifications may be suggested to one skilled in the art. It is intended that the present invention encompass those changes and modifications as they fall within the scope of the claims.

What is claimed is:

1. A method for retrieving data stored in a plurality of memory locations in data memory comprising:
   receiving the address of a first memory location in the data memory storing a first portion of the data;
   obtaining, from a location in a link memory specified by the address of the first memory location, a second address of a second memory location in the data memory storing a second portion of the data;
   retrieving the first and second portions of the data in the first and second memory locations in the data memory; and
   wherein obtaining the second address and retrieving the first portion of data occur substantially concurrently.

2. The method of claim 1, wherein the portion of data comprises an ATM cell.

3. The method of claim 1, wherein the data memory and the link memory are in communication with a telecommunications switch.

4. The method of claim 1, wherein receiving the address of a first memory location in the data memory comprises accessing a list storing a head pointer and a tail pointer for the stored data.

5. The method of claim 1, and further comprising obtaining, from a location in the link memory specified by the address of the second memory location, a third address of a third memory location in the data memory storing a third portion of the data.

6. A method for storing data in a plurality of memory locations in data memory for later retrieval comprising:
   storing a first portion of the data in a memory location in data memory having a first address;
   storing the first address as a tail pointer in a queue manager list;
   storing the first address at a previous tail pointer location in link memory; and
   wherein storing the first address as a tail pointer and storing the first address at a previous tail pointer occur substantially concurrently.

7. The method of claim 6, wherein the portion of data comprises an ATM cell.

8. The method of claim 6, wherein the data memory and the link memory are in communication with a telecommunications switch.

9. A system for storing data in a plurality of memory locations in data memory for later retrieval comprising:
   means for storing a first portion of the data in a memory location in data memory having a first address;
   means for storing the first address as a tail pointer in a queue manager list;
   means storing the first address at a previous tail pointer location in link memory; and
   wherein storing the first address as a tail pointer and storing the first address at a previous tail pointer occur substantially concurrently.

10. A system for retrieving data stored in a plurality of memory locations in data memory comprising:
    means for receiving the address of a first memory location in the data memory storing a portion of the data;
    means for obtaining from a location in a link memory specified by the address of the first memory location, a second address of a second memory location in the data memory storing a second portion of the data;
    means for retrieving the first and second portions of the data stored in the first and second memory locations in the data memory; and
    wherein obtaining the second address and retrieving the first portion of data occur substantially concurrently.

11. Software encoded on a computer readable medium operable, when executed on a processor, to:
    receive the address of a first memory location in the data memory storing a first portion of the data;
    obtain, from a location in a link memory specified by the address of the first memory location, a second address of a second memory location in the data memory storing a second portion of the data;
    retrieve the first and second portions of the data in the first and second memory locations in the data memory; and
    wherein the software is further operable to obtain the second address and retrieve the first portion of data substantially concurrently.

12. The software of claim 11, wherein the portion of data comprises an ATM cell.

13. The software of claim 11, wherein the data memory and the link memory are in communication with a telecommunications switch.

14. The software of claim 11, wherein the software is further operable to receive the address of a first memory location in the data memory by accessing a list storing a head pointer and a tail pointer for the stored data.

15. The software of claim 11, wherein the software ifs further operable to obtain, from a location in the link memory specified by the address of the second memory location, a third address of a third memory location in the data memory storing a third portion of the data.

16. Software encoded on a computer readable medium operable, when executed on a processor, to:
    store a first portion of the data in a memory location in data memory having a first address;
    store the first address as a tail pointer in a queue manager list;
    store the first address at a previous tail pointer location in link memory; and wherein the software is further operable to store the first address as a tail pointer and store the first address at a previous tail pointer substantially concurrently.

17. The software of claim 16, wherein the portion of data comprises an ATM cell.

18. The software of claim 16, wherein the data memory and the link memory are in communication with a telecommunications switch.

* * * * *

UNITED STATES PATENT AND TRADEMARK OFFICE
CERTIFICATE OF CORRECTION

PATENT NO. : 6,728,857 B1
DATED : April 27, 2004
INVENTOR(S) : Franco

It is certified that error appears in the above-identified patent and that said Letters Patent is hereby corrected as shown below:

Column 8,
Line 12, after "means", insert -- for --.
Line 52, after the second "software", delete "ifs", and insert -- is --.

Signed and Sealed this

Fifth Day of October, 2004

JON W. DUDAS
*Director of the United States Patent and Trademark Office*